Patented Jan. 23, 1940

2,187,821

UNITED STATES PATENT OFFICE

2,187,821

PREPARATION OF TITANIUM ALCOHOLATES AND PHENOLATES

Johannes Nelles, Leverkusen-Schlebusch, Germany, assignor to I. G. Farbenindustrie Aktiengesellschaft, Frankfort-on-the-Main, Germany No Drawing. Application March 2, 1937, Serial No. 128,633. In Germany March 4, 1936

9 Claims. (Cl. 260—429)

This invention relates to a method of preparing metallo-organic compounds where the metal is titanium and the organic portion is an alkyl or aryl radical.

It is known that metallo-organic compounds of the character described can be prepared by causing titanium tetrachloride to react upon an alkali metal alcoholate in alcoholic solution. This method involves the disadvantage that the alkali metal chloride formed as by-product precipitates in such a finely distributed form that its separation from the reaction liquor, as by filtration, presents considerable difficulties.

An object of the present invention is an improved method of preparing titanium alcoholates and phenolates respectively. This, and other objects, will become apparent from the following description of my invention.

I have found that titanium alcoholates and phenylates of the character described can be prepared in a simple and economical manner while avoiding the disadvantages inherent to the hitherto known process by causing titanium tetrahalides to react with alcohols or phenols in the presence of ammonia or organic bases. In order to avoid undesirable side-reactions the temperature is preferably kept between about 0° and 50° C. at least in the beginning of the reaction while towards the end a rise of temperature even up to the boiling point of the alcohols may be required in order to make the reaction complete. The titanium alcoholates and phenolates are thermically very stable so that a temporary heating to higher temperatures will not detrimentally affect them.

My invention is particularly adapted to the use of the lower aliphatic alcohols, but it is not restricted to this specific group. Aliphatic and aromatic alcohols also of higher molecular weight and phenols are operative. It has been found that with an increasing molecular weight of the alcohols the speed of their reaction with a titanium tetrachloride decreases but not to an extent which would make the reaction inoperative. Moreover, in preparing the titanium alcoholates of alcohols with a higher molecular weight I have found it convenient and useful to prepare first the titanium alcoholate of an alcohol with a lower molecular weight, e. g., the ethylate which is then allowed to react under double decomposition with the higher alcohol in question.

The bases used in carrying out the reaction are ammonia and the aliphatic and aromatic amines. When using amines it has proved useful to add to the reaction mixture inert organic solvents such as benzene, ether, carbon tetrachloride etc., since in these solvents the chlorhydrates formed during the reaction are insoluble and separate in an easily filtrable form. The amount of ammonia or organic bases used should be sufficient to combine with all the halide liberate.

The invention is illustrated by the following examples, but not restricted thereto (the parts being by weight):

Example 1

50 parts of titanium tetrachloride are mixed with 150 parts of absolute ethyl alcohol and, while cooling externally and stirring, a solution of 19 parts of ammonia in 150 parts of absolute ethyl alcohol is run in. Upon completion of the reaction the ammonium chloride is removed by filtration and the filtrate distilled under reduced pressure. Titanium tetraethylate boils at 150–155° C. under a pressure of 12 mm.; yield 87%.

If in this example 50 parts of titanium tetrachloride are replaced by 100 parts of titanium tetrabromide and if otherwise is worked in the same way, titanium tetraethylate is obtained, after removing the ammonium bromide, in good yield.

Example 2

The calculated amount of ammonia is passed into a cooled solution of 50 parts of titanium tetrachloride in 300 parts of butyl alcohol. Now the mixture is heated up to 50–60° C. for a short time, the separated ammonium chloride is removed and the filtrate distilled under reduced pressure. Titanium tetrabutylate boils at 185–188° C. under a pressure of 11 mm. Yield: 80%.

Example 3

24 parts of titanium tetrachloride are dropped while stirring into a solution of 50 parts of phenol in 220 parts of benzene and the mixture is heated with reflux till the elimination of hydrogen chloride is completed.

The reddish-brown solution is cooled to room-temperature and a solution of 8 parts of butyl-amine in 18 parts of benzene is dropped in whereby the temperature rises slightly. After cooling and, if necessary, inspissating the mass crystallizes in light red crystals. By recrystallization from benzene the pure titanium tetraphenylate is obtained which melts at 153–154° C.

Example 4

When in Example 3 the butylamine is replaced by 12 parts of aniline a mixture of titanium tetraphenylate and aniline hydrochloride is obtained from which the pure titanium tetraphenylate can be obtained by extraction with benzene.

Example 5

190 parts of titanium tetrachloride are dropped while stirring and avoiding access of air humidity into a solution of 700 parts of phenyl-propyl-carbinol in 2000 parts of benzene whereupon 70 parts of ammonia are passed in. The mixture is heated up to 50–60° C. for a short time and the separated ammonium chloride is removed by filtration. The filtrate is concentrated without access of humidity and the residue is freed from excess of carbinol by heating in vacuo. An almost quantitative yield of a light red oil of the formula

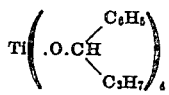

is obtained.

Example 6

230 parts of titanium tetraethylate are heated up to 150° C. together with 380 parts of phenol in a vessel connected with a descending condenser. The calculated amount of ethyl alcohol distils over. The solid red residue can be purified by recrystallization from benzene and the titanium tetraphenylate is obtained in orange coloured crystals melting at 153–154° C.

It will be observed in the above examples that is of no fundamental importance whether the titanium tetrahalide is added to the alcohol or vice-versa.

The above description and the specific examples are to be taken as illustrative only and not as limiting the scope of the invention. Any modification or variation therefrom which conforms to the spirit of the invention is intended to be included within the scope of the claims.

I claim:

1. The process which comprises causing titanium tetrahalides to react with a hydrocarbon hydroxy compound in the presence of nitrogen containing compounds selected from the group consisting of ammonia and amines care being taken that the liquids of the reaction are anhydrous.

2. The process which comprises causing titanium tetrahalides to react with a lower aliphatic alcohol in the presence of nitrogen containing compounds selected from the group consisting of ammonia and amines care being taken that the liquids of the reaction are anhydrous.

3. The process which comprises causing titanium tetrachloride to react with a lower aliphatic alcohol in the presence of nitrogen containing compounds selected from the group consisting of ammonia and amines care being taken that the liquids of the reaction are anyhdrous.

4. The process which comprises causing titanium tetrahalide to react with a lower aliphatic alcohol in the presence of ammonia care being taken that the liquids of the reaction are anhydrous.

5. The process which comprises causing titanium tetrachloride to react with a lower aliphatic alcohol in the presence of ammonia care being taken that the liquids of the reaction are anhydrous.

6. The process which comprises causing titanium tetrahalides to react with phenol in the presence of nitrogen containing compounds selected from the group consisting of ammonia and amines care being taken that the liquids of the reaction are anhydrous.

7. The process which comprises causing titanium tetrachloride to react with phenol in the presence of aniline care being taken that the liquids of the reaction are anhydrous.

8. The process which comprises causing titanium tetra-halides to react with an alcohol in the presence of nitrogen containing compounds selected from the group consisting of ammonia and amines, care being taken that the liquids of the reaction are anhydrous.

9. The process which comprises causing titanium tetra-halides to react with a phenol in the presence of nitrogen containing compounds selected from the group consisting of ammonia and amines, care being taken that the liquids of the reaction are anhydrous.

JOHANNES NELLES.